US010226774B2

United States Patent
Franko

(10) Patent No.: US 10,226,774 B2
(45) Date of Patent: Mar. 12, 2019

(54) MULTI-ZONED PADDLE SCREEN APPARATUS

(71) Applicant: Fluid Quip, Inc., Springfield, OH (US)

(72) Inventor: Andrew Franko, Bellbrook, OH (US)

(73) Assignee: Fluid Quip, Inc., Springfield, OH (US)

( * ) Notice: Subject to any disclaimer, the term of this patent is extended or adjusted under 35 U.S.C. 154(b) by 10 days.

(21) Appl. No.: 15/520,873

(22) PCT Filed: Jan. 27, 2016

(86) PCT No.: PCT/US2016/015058
§ 371 (c)(1),
(2) Date: Apr. 21, 2017

(87) PCT Pub. No.: WO2016/137641
PCT Pub. Date: Sep. 1, 2016

(65) Prior Publication Data
US 2017/0368555 A1 Dec. 28, 2017

Related U.S. Application Data

(60) Provisional application No. 62/119,528, filed on Feb. 23, 2015.

(51) Int. Cl.
*B03B 11/00* (2006.01)
*B03B 5/56* (2006.01)
(Continued)

(52) U.S. Cl.
CPC ............... *B03B 5/56* (2013.01); *B01D 29/23* (2013.01); *B01D 29/54* (2013.01);
(Continued)

(58) Field of Classification Search
CPC .............. B04B 1/02; B04B 2001/2041; B04B 2001/2083; B04B 2001/2091; B04B 3/04;
(Continued)

(56) References Cited

U.S. PATENT DOCUMENTS 15,455 A * 7/1856 Mendenhall .............. B07B 1/24
209/296
117,990 A * 8/1871 Damp et al. .............. B07B 7/06
209/22
(Continued)

OTHER PUBLICATIONS

PCT Office, International Preliminary Report on Patentability issued in PCT/US2016/015058 dated Aug. 29, 2017, 6 pages.
(Continued)

*Primary Examiner* — Joseph C Rodriguez
(74) *Attorney, Agent, or Firm* — Wood Herron & Evans LLP

(57) ABSTRACT

A multi-zoned paddle screen apparatus 100 is disclosed for separating fiber from a liquid medium during, for example, a grain wet mill or dry grind process. The apparatus includes a housing 106 having first and second zones 108a, 108b situated adjacent one another along a length (L) of the housing 106. First and second screen sections 102a, 102b having a plurality of openings 104 may be situated lengthwise within the housing 106 corresponding with the first and second zones 108a, 108b, respectively. The first and second screen sections 102a, 102b have a circular cross-section, and the second screen section 102b has a larger diameter than the first screen section 102a. An elongated shaft 130 situated lengthwise within the screen sections 102a, 102b includes first and second conveyors 128a, 128b, which correspond with the first and second zones 108a, 108b, respectively, having a plurality of paddles 132. Each conveyor 128a, 128b is configured to move material in a direction along a length of the screen 102a, 102b. There may be more than two zones 108a, 108b.

16 Claims, 3 Drawing Sheets

(51) Int. Cl.
*B01D 29/23* (2006.01)
*B01D 29/54* (2006.01)
*B01D 29/64* (2006.01)
*B01D 29/78* (2006.01)
*B01D 29/94* (2006.01)
*B07B 1/20* (2006.01)
*B03B 9/00* (2006.01)
*B07B 1/06* (2006.01)

(52) U.S. Cl.
CPC ......... *B01D 29/6476* (2013.01); *B01D 29/78* (2013.01); *B01D 29/94* (2013.01); *B03B 9/00* (2013.01); *B03B 11/00* (2013.01); *B07B 1/06* (2013.01); *B07B 1/20* (2013.01); *B01D 2201/02* (2013.01); *B07B 2230/01* (2013.01)

(58) Field of Classification Search
CPC ......... B07B 1/06; B07B 1/20; B07B 2230/01; B01D 33/06; B01D 33/11; B01D 25/02; B01D 25/04; B03B 5/56; B03B 11/00
See application file for complete search history.

(56) References Cited

U.S. PATENT DOCUMENTS

| | | | | |
|---|---|---|---|---|
| 1,589,097 | A * | 6/1926 | Behr | B04B 3/04 210/213 |
| 2,447,286 | A * | 8/1948 | Smith | C02F 11/128 210/313 |
| 4,140,629 | A * | 2/1979 | Martindale | B01D 33/11 209/240 |
| 4,154,574 | A * | 5/1979 | Keirle | C21D 9/0018 209/296 |
| 4,202,759 | A * | 5/1980 | Krolopp | B04B 5/12 209/234 |
| 4,202,773 | A * | 5/1980 | Fink | B04B 1/20 100/117 |
| 4,582,202 | A * | 4/1986 | Stone | B07B 1/24 209/284 |
| 4,915,830 | A * | 4/1990 | Mackay | B30B 9/12 100/117 |
| 4,997,578 | A * | 3/1991 | Berggren | B30B 9/12 100/117 |
| 5,570,790 | A * | 11/1996 | Rumpf | B07B 1/20 209/291 |
| 5,593,042 | A * | 1/1997 | Keller | B07B 1/20 209/261 |
| 5,601,690 | A * | 2/1997 | Gauld | B07B 1/20 162/55 |
| 5,800,332 | A | 9/1998 | Hensley | |
| 6,071,378 | A * | 6/2000 | Saito | B01D 33/11 100/117 |
| 6,451,213 | B2 * | 9/2002 | Huebner | B01D 29/23 210/770 |
| 8,813,973 | B2 * | 8/2014 | Lee | B04B 3/04 210/350 |
| 9,718,006 | B2 * | 8/2017 | Lee | B01D 29/90 |
| 2001/0001457 | A1 | 5/2001 | Huebner | |
| 2010/0237023 | A1 | 9/2010 | Sprague | |

OTHER PUBLICATIONS

PCT Office, International Search Report and Written Opinion issued in PCT/US16/15058 dated Apr. 25, 2016, 9 pages.
European Patent Office, Supplementary Search Report issued in European Patent Application No. 16756027.5 dated Sep. 27, 2018, 7 pages.

* cited by examiner

MULTI-ZONED PADDLE SCREEN APPARATUS

TECHNICAL FIELD

The invention relates generally to separating material from a liquid medium and, more particularly, to an apparatus and method for separating fiber from a slurry or other liquid medium. The present invention also relates to classifying particles according to size and/or density.

BACKGROUND

A wide range of industrial applications require a bulk material to be separated or isolated into several constituent parts through, for example, some type of filtration process utilizing a liquid medium. Once filtered, the separated constituent, and/or the remainder of the bulk material and liquid medium, may be further processed so as to result in one or more desired products. By way of example, various methods of producing alcohol from grain may require that the fibrous constituent of the grain be separated from the starch and/or other constituents of the grain. A corn wet milling process, for example, separates the fiber from the starch in corn and subsequently uses the starch to produce ethanol, which may be used in automobiles or other motor vehicles. A dry grind milling process, for example, also separates its fiber, or insoluble solids ("wet cake"), from the liquid or "thin stillage" from the residuals, i.e., "whole stillage", produced from distillation. Such fiber is subsequently used to produce Distillers Wet Grain with Soluble (DWGS) or Distillers Dried Grain with Soluble (DDGS). Filtration processes that separate a constituent from a liquid medium involve a step in other industrial applications as well. In this regard, the pulp and paper industry often requires the separation of fiber from a fibrous bulk material. Such filtration processes also exist in the textile manufacturing industry, the chemical industry (e.g., crystal formation applications), and other fields.

In a corn wet mill process, for example, to facilitate separation of the various constituents of the corn, the corn is mixed with water to form a slurry having a relatively high percentage of water (e.g., 80% or higher). The fiber is then filtered from the slurry, which contains, for example, starch and gluten constituents of the corn in addition to the water. In the corn wet mill process, conventional devices for filtering the fiber from the starch-containing slurry may include pressure screen devices and paddle screen devices. After initially filtering the fiber from the slurry, some of the starch and/or the gluten may still be associated with the fiber. Thus, it may be desirable to wash the fiber and remove additional amounts of starch and/or gluten therefrom. In this regard, the fiber is typically mixed with a liquid medium, such as wash water, and directed back through a pressure screen or a paddle screen device to separate the fiber from the wash water, which contains the additional starch and/or gluten washed from the fiber. The slurry is further processed to produce ethanol.

Conventional systems may include multiple washing stages to remove the starch and/or gluten from the fiber. For example, processing systems utilizing pressure or paddle screen devices typically include six or seven such stages. These various stages typically include separate, dedicated devices to facilitate washing of the fiber with wash water, which is then directed to a pressure screen or paddle screen device for filtration of the fiber therefrom. In addition, subsequent to washing, the fiber may be, or may need to be, de-watered, which can require yet another device. Alternatively, some devices are capable of both filtering and washing the fiber.

The pressure screen devices, for example, can direct the slurry to flow through a static screen under relatively low fluid pressure. The screen includes openings sufficiently sized so as to permit the water, starch, and gluten (any other constituents smaller than the openings) to flow through the screen, but prevent the fiber from flowing therethrough, thus essentially filtering the fiber from the slurry. Paddle screen devices include rotating paddles with a stationary drum including an outer wall configured as a screen. The rotation of the paddles directs the slurry toward the screened outer wall and essentially presses the slurry so as to force the water, the starch, and the gluten through the screen while preventing the fiber from passing therethrough. The movement of the paddles relative to the drum loosens the fiber from the outer wall and reduces plugging of the screen openings. Also, the centrifugal force created by the rotating paddles provides a higher filtration pressure as compared to the pressure screens. This higher pressure gives a higher capacity per unit screen surface, but larger sized particles can be forced through the screen in the paddle screen devices. These devices may include a washing stage, after which the fiber is filtered again. In many applications, pressure screen and/or paddle screen devices cannot dewater to the required dryness and another device, such as a screw press or drum filter under vacuum, is required to further dewater the solids.

Pressure screen devices may include a conical screen where the diameter varies. The diameter of these types of screen is commonly decreased as the material moves from a feed section to a discharge section. By decreasing the diameter of the cylindrical screen, the slurry is compacted. As the slurry becomes compacted, more of the water and smaller particles may be forced through the screen. However, this compression of the slurry may create a "mat" of solids, which can undesirably consume more energy. If the mat becomes too thick, the separation of the fiber from the water, the starch, and the gluten, for example, also may become more difficult. Because the energy required to process a given amount of bulk material increases as the diameter of the cylindrical screen increases, increasing the diameter of the cylindrical screens in paddle screen devices is generally undesirable.

Although such systems operate for their intended purpose, these systems have several drawbacks. For example, the washing of the fiber in these systems is typically inefficient leading to a relatively large number of stages. These large, multiple-stage systems, which often include multiple devices, represent significant capital and/or operating costs, as well as high maintenance costs for those devices. Furthermore, the above systems are prone to screen blinding and significant down time. For example, pressure screen systems generally require a high pressure washing about every eight hours of operation so as to function adequately.

Accordingly, there is a need for an improved apparatus and method for separating material, such as fiber, from a slurry or other liquid medium in a more efficient manner.

SUMMARY

The present invention is directed to an apparatus and method for separating fiber from a slurry or other liquid medium during, for example, a grain wet mill or a dry grind process.

In one embodiment, a multi-zoned paddle screen apparatus includes an elongated housing including at least a first zone and a second zone situated adjacent to one another along a length of the housing. At least first and second screen sections having a plurality of openings are situated adjacent one another along a length of the housing so as to generally correspond with the first and second zones, respectively. Each of the first and second zones are configured to collect liquid medium that passes through the plurality of openings in the first and second screen sections, respectively. The second screen section is larger in diameter than the first screen section. An elongated shaft including at least first and second conveyors is situated lengthwise within the first and second screen sections, respectively. Along a length of the shaft so as to generally correspond with the first and second zones, respectively, at least one of the conveyors includes a plurality of paddles extending in a direction away from the shaft. Each of the first and second conveyor sections are configured to move material in a direction along a length of the corresponding screen section. At least one feed inlet is in fluid communication with an interior of the first screen section to supply the liquid medium and the material to the multi-zoned paddle screen apparatus. The apparatus further includes a discharge chute that collects filtered material from the multi-zoned paddle screen apparatus.

In one example, the first screen section and the second screen section together define a cylindrical configuration of increasing diameter. In another example, each of the first and second conveyors are configured to provide a centrifugal force, and the second conveyor provides a centrifugal force higher than that of the first conveyor.

In another embodiment, the present invention is directed to a method of separating a material from a liquid medium utilizing the multi-zoned paddle screen apparatus.

BRIEF DESCRIPTION OF THE DRAWINGS

The accompanying drawings, which are incorporated in and constitute a part of this specification, illustrate embodiments of the invention and, with a detailed description of the embodiments given below, serve to explain the principles of the invention.

DETAILED DESCRIPTION OF SPECIFIC EMBODIMENTS

Corn wet mill processing plants can convert corn grain into several different co-products, such as germ (for oil extraction), gluten feed (high fiber animal feed), gluten meal (high protein animal feed), and starch-based products such as ethanol or butanol and the like, high fructose corn syrup, or food and industrial starch. The typical corn wet milling process can include a fiber separation step in which a slurry of water, fiber, gluten, and starch is passed through a series of screens in order to separate the fiber from starch and gluten, and to wash the fiber clean of gluten and starch. Similarly, the typical dry grind process can include a centrifugation step wherein fiber similarly is filtered or separated from a slurry. It will be understood by one having ordinary skill in the art that the typical corn wet mill process and dry grind process may be manipulated and modified as desired.

Figure 1:
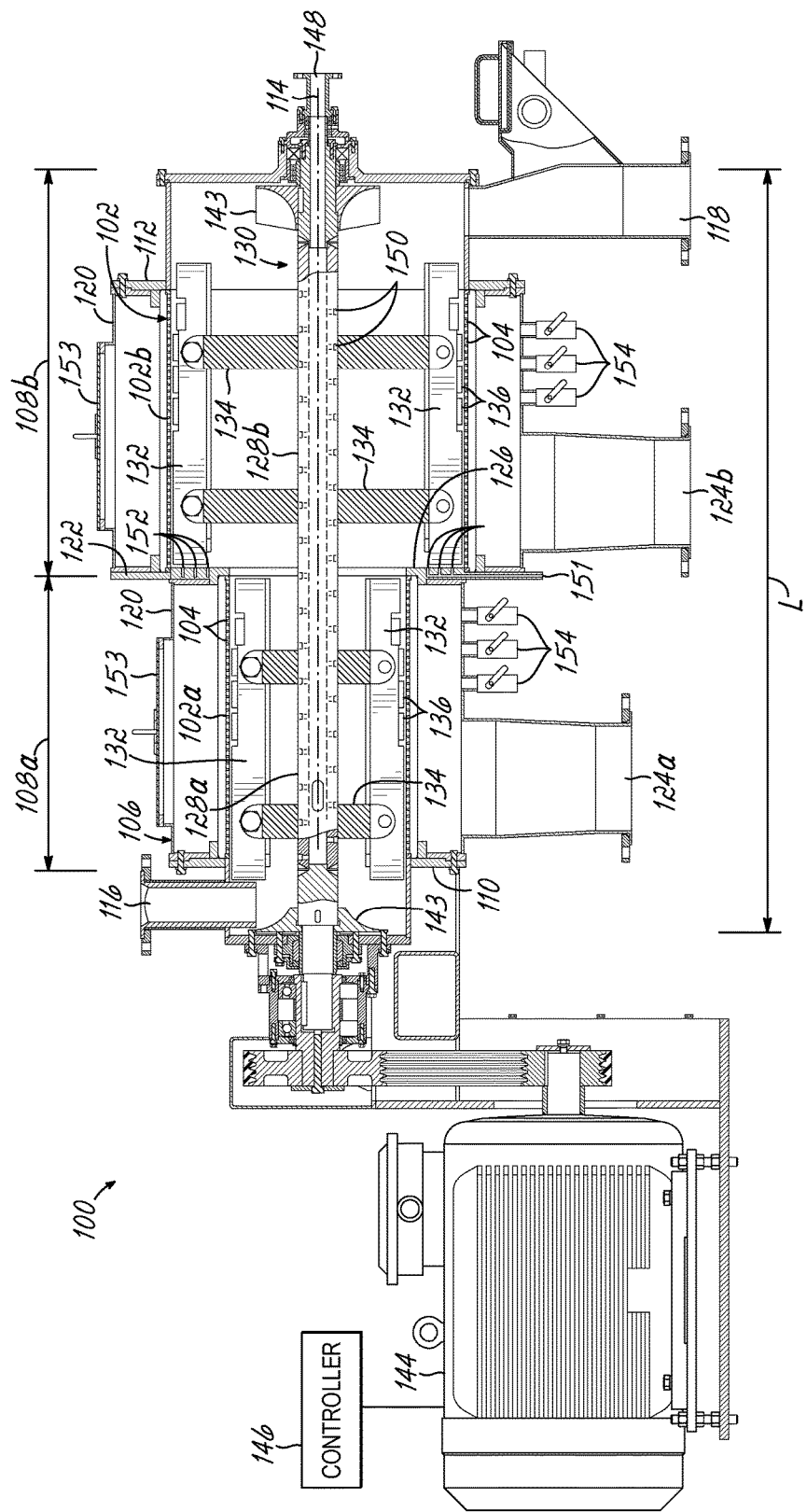
FIG. 1 is a cross-sectional view of a multi-zoned paddle screen apparatus in accordance with an embodiment of the invention.

In accordance with an embodiment of the invention, FIG. 1 shows an apparatus 100 for achieving separation, washing, and de-watering of the fiber from the slurry, which may be incorporated into the fiber separation step of the corn wet mill process or the centrifugation step of the dry grind process. Other locations for the apparatus 100 in either process for accomplishing the same are contemplated as well. In addition, the apparatus 100 may be utilized at various locations in other types of alcohol production processes to separate material from liquid medium, including, for example, in the methods disclosed in WO 2012/075481, filed Dec. 5, 2011, and WO 2012/129500, filed Mar. 23, 2012, the contents of which are incorporated herein by reference in their entirety.

With further reference to FIG. 1, the apparatus 100 is a single, self-contained device configured for pre-washing, separating, i.e., filtering, a material, e.g., fiber, from a liquid medium, and then further washing/de-watering the material. With respect to the wet milling process, for example, the apparatus 100 can perform both an initial filtering of the slurry and pre-washing of the fiber to clean the fiber and to remove the starch/gluten associated with the fiber, as well as washing/dewatering of the fiber. With respect to the dry milling process, the apparatus 100 also can perform both an initial filtering and pre-washing of the fiber to clean the fiber and to remove the thin stillage that is associated with the fiber, as well as the washing/dewatering of the fiber.

The apparatus 100, as shown in FIG. 1, includes a stationary first screen section 102a and a stationary second screen section 102b. The first and second screen sections 102a, 102b have a circular cross-section, and the second screen section 102b has a larger diameter than the first screen section 102a. The first and second screen sections 102a, 102b have a plurality of openings 104 formed therein to permit the liquid medium, including any wash water and any starch and/or gluten and/or fine suspended particles (including yeast from fermentation) washed from the fiber, for example, to pass through the screen sections 102a, 102b while preventing the coarser fiber from passing therethrough. The screen sections 102a, 102b are disposed within an elongated housing 106 and are situated adjacent one another therealong so as to generally correspond with a first zone 108a and a second zone 108b, respectively. The housing 106 includes a first end wall 110 and a second end wall 112.

The screen sections 102a, 102b are situated about a central axis 114 of the apparatus 100 and extend substantially along a length (L) thereof. The first screen section 102a extends partly along the length of the apparatus 100 to about a midway point thereof, and the second screen section 102b is situated adjacent the first screen section 102a at about the midway point and extends partly along the remainder of the length of the apparatus 100. A tangential feed inlet 116 is situated proximate the first screen section 102a at one end of the apparatus 100 adjacent the first zone 108a to provide the incoming material and liquid medium. A fiber discharge chute 118 is situated proximate the second screen section 102b at an opposing end of the apparatus 100 adjacent the second zone 108b.

It is noted that the lengths of the first and second screen sections 102a, 102b may vary but, due to the overall length thereof, a large volume of liquid medium and material can be processed while still producing a desirably dry material.

For example, the first or second screen section 102a, 102b may extend less than or more than about the midway point of the apparatus 100.

Figure 2:
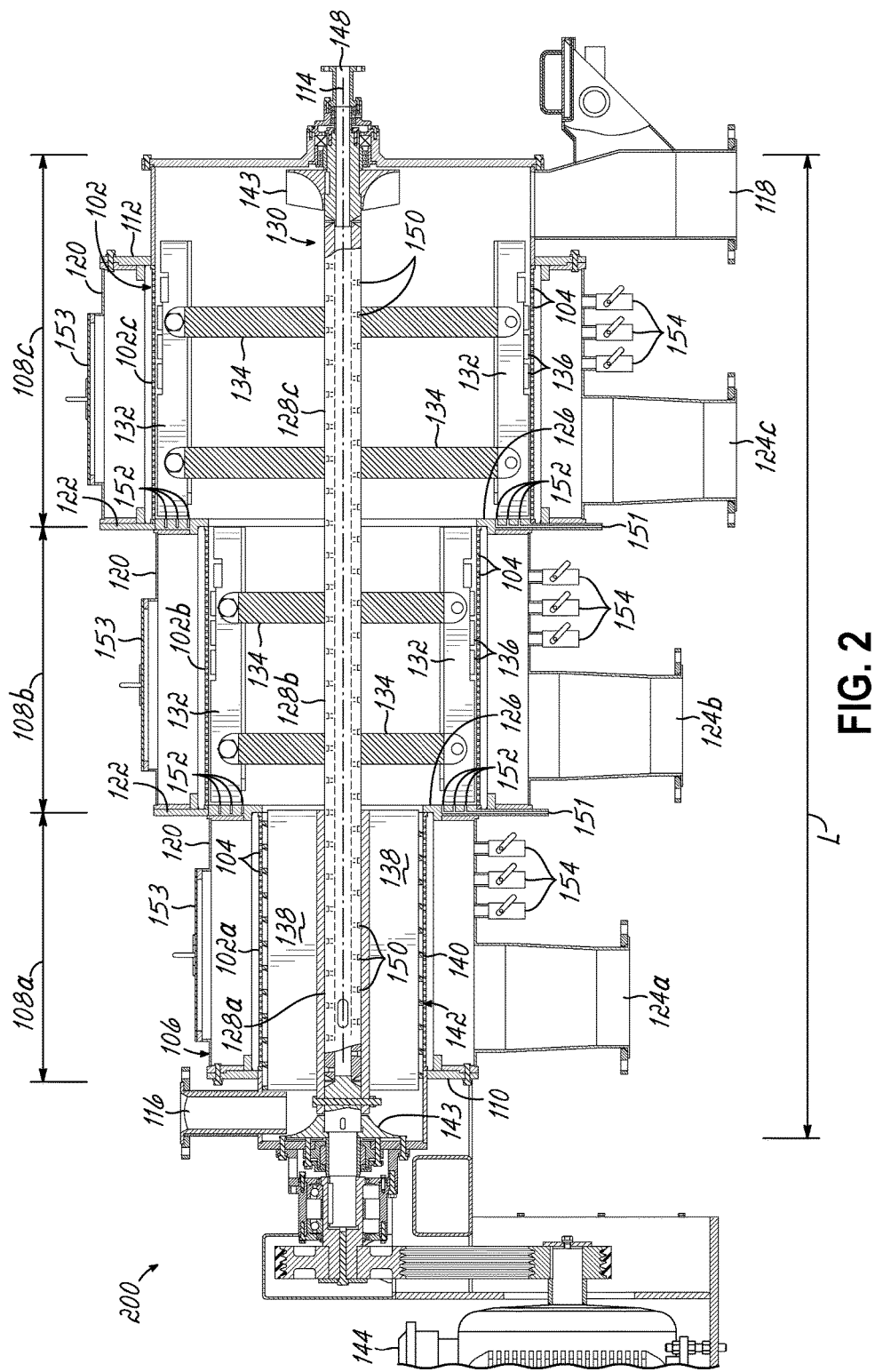
FIG. 2 is a cross-sectional view of a multi-zoned paddle screen apparatus in accordance with another embodiment of the invention.

Further, while only two zones 108a, 108b are shown in FIG. 1, it is understood that more than two zones 108a, 108b may be utilized. To that end, the apparatus 200, as shown in FIG. 2, includes a stationary first screen section 102a, a stationary second screen section 102b, and a stationary third screen section 102c disposed within housing 106. The screen sections 102a, 102b, 102c have a circular cross-section and correspond to a first zone 108a, a second zone 108b, and a third zone 108c, respectively. The second screen section 102b has a larger diameter than the first screen section 102a, and the third screen section 102c has a larger diameter than the second screen section 102b. In one example, the diameters of the first, second, and third screen sections 102a, 102b, 102c may be about 16 in, 24 in, and 32 in, respectively. Those skilled in the art will recognize that the increase in diameter between screen sections 102 may be selected and optimized to meet the needs of a particular application. For example, when processing a material that is easily dewatered, the screen section 102c may have a length of 18 in and a diameter of 28 in. In another example, the ratios of the diameters of the first, second, and third screen sections 102a, 102b, 102c may be altered by a factor of about 2.

Moreover, it is contemplated that the screen diameter may vary along at least one or more portions thereof. As shown in FIG. 1, the first zone 108a and the first screen section 102a and the second zone 108b and the second screen section 102b together define a stepped cylindrical configuration, where the diameters of the screen sections 102a, 102b are substantially constant along their lengths. In another embodiment shown in FIG. 3, the first zone 108a and the first screen section 102a and the second zone 108b and the second screen section 102b of apparatus 300 together define an outwardly expanding conical configuration, with the proximal end of the second screen section 102b initially being larger in diameter than the distal end of the first screen section 102a.

Again, it is noted that the lengths of the screen sections of embodiments of the present invention may vary but, due to the overall length thereof, a large volume of liquid medium and material can be processed while still producing a desirably dry material. For example, the first, second, or third screen sections 102a, 102b, 102c may extend less than or more than about a third of the length of the apparatus 100. In one example, each of the screen sections 102 may have a length of about 22 in.

With further reference to FIG. 1, the screen sections 102a, 102b may include a wedge wire type with slot opening, or a round hole, thin plate screen. In other embodiments, the screen sections may be a bar screen, a thin metal screen (e.g., mesh screen), or a filter cloth having a metal reinforced design. Those of ordinary skill in the art will recognize other types of screens that may be used in accordance with embodiments of the invention. The openings 104 in the screen sections 102a, 102b may vary depending on the specific application and on the type of material being filtered. For example, for fiber filtration, it is contemplated that the openings 104 in the first and second screen sections 102a, 102b may be sized from about 28 microns (0.028 mm) to about 1500 microns (1.5 mm). The openings 104 in the first screen section 102a may be smaller than, larger than, or the same size as the openings 104 in second screen section 102b. Those of ordinary skill in the art will recognize how to determine the size of the openings 104 to achieve the filtration of the desired material. Generally, the screen sections 102a, 102b can be provided with smaller openings 104 due to the overall length thereof. In certain applications, increasing the length of the screen sections 102a, 102b allows for smaller openings 104, which provides for a more desirable dewatering of the materials through the apparatus 100. Further, increasing the diameter of the screen sections 102a, 102b may allow for smaller openings 104 due to the increased centrifugal force Smaller openings 104 may also limit the amount of solids passing through the screen sections 102a, 102b while still providing for desirable recovery of liquid medium and output of dry material, e.g., fiber. By using different screen opening sizes in the first and second sections 102a, 102b, a separation of solids according to particle size can be achieved. This, for example, could allow recycling large particles back to the beginning of a particle size reduction process for further grinding or milling to further yet reduce the size of the large particles. In some applications, different size particles might be collected separately to be used in final different applications.

As indicated above, the housing 106 generally surrounds the screen sections 102a, 102b and is adapted to collect the medium that passes through the openings 104 in the screen sections 102a, 102b. The housing 106 includes at least one side wall 120 connecting the first and second end walls 110, 112 so as to define the interior. The housing 106 further includes at least one panel 122 that helps compartmentalize and separate the housing 106 into the first and second zones 108a, 108b, which are situated adjacent one another. First and second hoppers 124a, 124b are also included in the first and second zones 108a, 108b, respectively, with corresponding outlets to remove the filtered liquid medium and direct the filtered liquid medium to a desired location. The housing 106 may have any suitable shape. While FIG. 1 shows the housing 106 having a larger diameter in the second zone 108b as compared to the diameter of the housing 106 in the first zone 108a, it is contemplated that other configurations may be used. For example, the housing 106 may have a constant diameter in the first and second zones 108a, 108b. To that end, it is further contemplated that the first and second hoppers 124a, 124b may be replaced with only a single hopper (not shown) so as to collect all of the filtered liquid medium from the apparatus 100. It is also contemplated that more than the first and second hoppers 124a, 124b may be provided to further divide up and collect the filtered liquid medium. With respect to the apparatus 200 of FIG. 2, there may be less than or more than the three hoppers 124a, 124b, 124c as shown, as desired.

The apparatus 100 further includes at least one stationary support ring 126, which may be 0-shaped and vertically oriented, that generally connects the first and second screen sections 102a, 102b and defines a juncture therebetween. The support ring 126 also helps compartmentalize and separate the housing 106 into the first and second zones 108a, 108b. The support ring 126 also provides support to the screen sections 102a, 102b and aids in sealing the screen sections 102a, 102b. Additionally, the support ring 126 may act as a "step' or 'drop-off' from the first screen section 102a into the second screen section 102b over which the material and medium must pass creating additional agitation that aids in the separation of the material from the medium. It is noted that the depth of the "drop-off" may vary. In other words, the change in diameter between the screen sections 102a, 102b at the juncture defined by the support ring 126 may vary, as desired. In one example, the depth of the drop off created by the support ring 126 is no less than 1 inch. In another example, the depth of the drop off is no greater than 2× the radius of the preceding screen section, see e.g., first screen section 102a. By way of example, with respect to the support ring 126 in FIG. 1, if the preceding screen section 102a has a 10 inch diameter, the drop off created by the support ring 126 should be no greater than 10 inches (2×5 inch radius=10 inch). In another example, the depth of the drop off is no greater than 1× the radius of the preceding screen section.

The first zone 108a may generally define an initial pre-washing and separation zone, and the second zone 108b may generally define a washing/dewatering zone. The end of the second zone 108b includes the discharge chute 118 where the separated and washed/de-watered fiber material may be collected for further processing. Although two zones 108a, 108b are illustrated here, those of ordinary skill in the art will appreciate that the number of separation zones 108a and the number of washing/dewatering zones 108b may be application specific, i.e., may vary in number as well as in length. If more than two zones 108 are desired (e.g., see FIG. 2), the housing 106 is simply adapted to include an additional interior panel 122 and an additional support ring 126 to further compartmentalize the housing 106 into first, second, and third zones 108a, 108b, 108c, which can include screen sections 102a, 102b, 102c and hoppers 124a, 124b, 124c, respectively, with corresponding outlets for removing the filtered liquid medium and directing the filtered liquid medium to a desired location. Zone 108c may generally define a washing/dewatering zone in addition to zone 108b. As the length of the screen sections 102 may vary, so may the length of the zones 108a, 108b, 108c. For example, the first, second, or third zone 108a, 108b, 108b may extend less than or more than about a third of the length of the apparatus 100. Those of ordinary skill in the art will recognize that the number of zones 108a, 108b, and 108c and the respective lengths may be selected and optimized to meet the needs of a particular application.

With further reference to the feed inlet 116, the feed inlet 116 is at one end of the apparatus 100 adjacent the first zone 108a and in fluid communication with an interior of the first screen section 102a, which also corresponds with the first zone 108a of the housing 106. The feed inlet 116 supplies the medium and material, e.g., fiber, to the apparatus 100, 200, 300 and can introduce the medium and material in a swirling fashion (tangential entry along outside wall) to start filtering the fiber upon entry into the apparatus 100, 200, 300. The flow rate of the medium and material supplied from the feed inlet 116 may vary. For example, a flow rate of about 1800 gpm may be used for a medium containing about 5 to about 30 percent material or solids.

With further reference to FIG. 1, a first conveyor 128a and a second conveyor 128b are disposed or situated lengthwise within the first and second screen sections 102a, 102b, respectively, for moving the material along the length of the first and second zones 108a, 108b, respectively, from the feed inlet 116 towards the discharge chute 118. The first and second conveyors 128a, 128b rotate relative to the stationary screen sections 102a, 102b and to the central axis 114 to direct the liquid medium and material towards and along the screen sections 102a, 102b to filter the material from the liquid medium.

The first and second conveyors 128a, 128b are included on a rotatable shaft 130 that extends along the length of the apparatus 100 and is situated about the central axis 114. At least one of the conveyors 128a, 128b includes a plurality of paddles 132 radially extending in a direction away from the shaft 130. Other configurations are contemplated where at least one conveyor but less than all of the conveyors includes a plurality of paddles. The paddles 132 extend adjacently parallel to the corresponding screen section and generally along the length thereof. Each paddle 132 is connected to the shaft 130 via a plurality of spaced apart support arms 134. The paddles 132 extend in a direction away from the shaft 130 such that an outer edge of each is situated in spaced apart relation to the screen sections 102a, 102b so as to provide a gap therebetween to provide a fluid flow passage for the liquid medium (e.g., slurry and/or wash water) during the filtration of the material (e.g., fiber), and can be sized to accommodate the design throughput of the apparatus 100. The gap between the screen sections 102a, 102b and the paddles 132 can range from about 1 to 20 mm. A smaller gap gives a drier cake with higher capacity and purer fiber. A larger gap gives a wetter cake with lower capacity and purer protein stream in slurry passing through screen openings, for example. The length of each paddle 132 may be adjusted, as desired. Further, the height of the paddles 132 and the height of the support arms 134 may vary. For example, the plurality of paddles of the second conveyor 128b can extend further from the shaft 130 than the plurality of paddles of the first conveyor 128a.

The number of paddles 132 can range from about 3 to about 8. Further, the number of paddles 132 may vary between conveyors 128a, 128b. The paddles 132 help move the material and medium radially towards and along the length of the first and second screen section 102a, 102b, as well as towards the discharge chute 118, so as to further separate and dry the material. Further, the spacing between the paddles 132 may be constant or variable from one paddle 132 to the next. Additionally, the shape and orientation of the paddles 132 may be changed as desired to adjust the flow of the liquid material and medium and the filtering characteristic of the apparatus 100. In one example, the paddles 132 may be oriented in a helical fashion about a length of the shaft 130. In another example, the pitch or angle of the paddles 132 relative to the shaft 130 may be adjusted.

There may be at least one bristle or rake 136 secured to the outer surface of the paddles 132, and occupying an area between the outer surface of the paddle 132 and the corresponding screen section. The rakes 136 may define individual triangular segments situated near the ends of the paddles 132. One or more rakes 136 may be angled or configured to help push the fiber towards the discharge chute 118. The number of rakes 136 can be modified depending on the amount of solids in the feed, for example. The rakes 136 may include an outer edge configured to be located in close proximity to the inner surface of the corresponding screen section. Those of ordinary skill in the art will recognize other configurations that facilitate the movement of the material through the apparatus 100 to meet the requirements of a particular application, and the invention is not limited to the particular configuration shown in FIG. 1.

Conveyor 128a or 128b may alternatively include a plurality of spaced apart vanes 138. With reference to FIG. 2, the apparatus 200 includes first, second, and third conveyors 128a, 128b, 128c. Conveyor 128a includes a plurality of spaced apart vanes 138, which extend generally horizontally along substantially the length of the first zone 108a. The spaced apart vanes 138 extend in a direction away from the shaft 130 and are spaced apart from the screen section 102a so as to provide a gap therebetween. The space between adjacent vanes 138 also defines an open cavity and similarly provides a fluid flow passage for the liquid medium during the filtration of the material, and likewise can be sized to accommodate the design throughput of the apparatus 200. The number and thickness of the vanes 138 can vary. Similar to the paddles 132, the shape and orientation of the vanes 138 may be changed as desired to adjust the flow of the liquid material and medium and the filtering characteristic of the apparatus 100. Conveyors 128b, 128c include a plurality of paddles 132 connected to the shaft 130 via a plurality of spaced apart support arms 134. Because the material may be drier in the third zone 108c as compared to the second zone 108b, there may be more friction created between the screen section 102c, paddles 132, and the material. If the material is fibrous, this added shear force may cause the particles to loosen and potentially separate into, for example, starch, protein, and germ particles.

There may be at least one ribbon flight 140 helically wound about and secured to the outer surfaces of the vanes 138 and occupying an area between the outer surface of the vanes 138 and the first screen section 102a. The ribbon flight 140, which can be continuous or discontinuous, may helically wind substantially about and along the length of the vanes 138, which together define an auger 142 for moving the material and liquid medium radially towards and along the length of the first screen section 102a, and in a direction towards the second screen section 102b, so as to help pre-wash and separate the material from the medium. The ribbon flight 140 may include an outer edge configured to be located in close proximity to the inner surface of the first screen section 102a.

Figure 3:
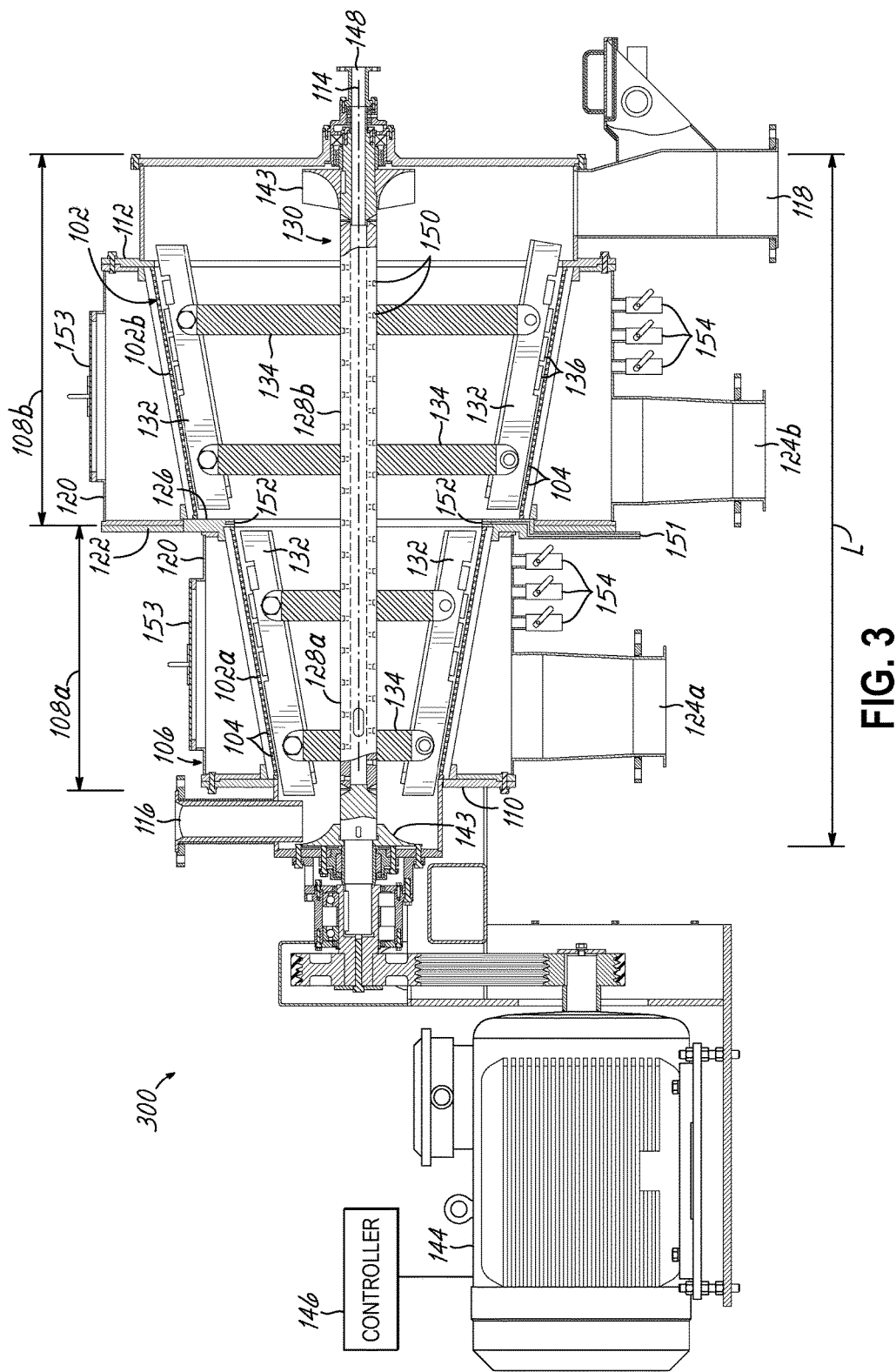
FIG. 3 is a cross-sectional view of a multi-zoned paddle screen apparatus in accordance with another embodiment of the invention.

Those of ordinary skill in the art will recognize other configurations that facilitate the movement of the material through the apparatus 100, 200, 300 to meet the requirements of a particular application, and the invention is not limited to the particular configuration shown in FIGS. 1-3. Also, with additional zones, i.e., more than two zones (see FIG. 2), it is contemplated that either the auger 142 or the plurality of paddles 132 connected to the shaft 130 via a plurality of spaced apart support arms 134, or the like, may be provided as desired for additional filtering/separation of the material from the liquid medium. In addition, the desired length of the conveyors 128a, 128b, 128c may be varied or dependent upon the feed rate of the medium and material and/or the composition thereof. Also, flingers 143 may be situated about opposing ends of the shaft 130 so as to help seal against leaks and to help direct liquid medium and/or material in a desired direction within the apparatus 100, 200, 300. The flingers may be of any desired shape or design, including spiral-flighted and the like, for example.

With further reference to FIG. 1, a motor 144 is operatively coupled to the shaft 130 for rotation of the conveyors 128a, 128b about the central axis 114. A controller, shown schematically at 146, can be operatively coupled to the motor 144 for controlling the rotational speed of the conveyors 128a, 128b, which may be constant or variable. Rotation of the shaft 130 may be achieved by a suitable motor 144 or other motive force-generating device, as understood in the art. For example, one end of the shaft 130 may be operatively coupled to an electric motor, such as via a suitable belt or by direct drive, so as to cause the shaft 130 to rotate about the central axis 114. In one embodiment, the controller 146 may be a computer, which can control the rotational speed of the shaft 130. Such a controller 146 is generally known to those of ordinary skill in the art. The rotational speed of the shaft 130 may be selectively varied depending on the specific application. A higher speed provides higher capacity but consumes more power. In one embodiment, the shaft 130 may be rotated at a speed (e.g., revolutions per minute) that can range from about 500 to about 1800 RPM (about 8.33 to about 30 hertz). As the conveyors 128a, 128b rotate at the same speed, a higher centrifugal force is provided in zone 108b due to the larger diameter of the second screen section 102b as compared to the first screen section 102a. The larger diameter of the second screen section 102b also creates a higher tangential linear velocity of the slurry around the inside circumference of the circular screen section 102b. The higher velocity creates more friction, and therefore shear, which helps to separate different particulate matter, possibly reduce some particle sizes, and aid in dewatering. In an embodiment where there are more than two zones 108, such as the apparatus 200 shown in FIG. 2, the centrifugal force and tangential linear velocity around the circumference increase as the diameters of the screen sections 102 increase. Those of ordinary skill in the art will recognize that the speeds may be selected and optimized to meet the needs of a particular application.

With reference again to FIG. 1, the shaft 130 further includes an optional liquid inlet 148 that is centrally situated within and extends substantially along the length of the shaft 130. The liquid inlet 148 is adapted to receive wash water therethrough from a desired source. The shaft 130 also has a plurality of liquid outlets 150 associated with the liquid inlet 148 and are spaced apart along substantially the length of the shaft 130 within the first and second zones 108a, 108b for introducing wash water therein. Further, the support ring 126 may be adapted to receive wash water therethrough from a separate liquid inlet 151 and also can be provided with liquid outlets 152 that provide wash water into an adjacent screen section by way of association with the liquid inlet 151. As shown here, the support ring 126 provides wash water to the second screen section 102b. With respect to FIG. 2, the support rings 126 provide wash water to both the second and third screen sections 102b, 102c. While the liquid outlets 152 of the support ring 126 of FIG. 1 (and FIG. 2) are shown, for example, as supplying wash water in a direction that is essentially parallel with shaft 130, one skilled in the art will appreciate that the liquid outlets 152 may be oriented at any of a variety of desired angles with respect to the shaft 130 for providing wash water to the second screen section 102b. See, e.g., FIG. 3, in which the liquid outlets 152 of support rings 126 are situated essentially perpendicular to the shaft 130 to provide wash water to the first and second screen sections 102a, 102b. The additional wash water provided at the juncture of zones 108a and 108b (and at the juncture of zones 108b and 108c at FIG. 2, for example) via the support ring(s) 126, in addition to the "drop off" at the support ring(s) 126, creates additional agitation that aids in the separation of the material from the medium. As the material and medium pass through to zone 108b, the paddles 132 further enhance the mixing of the material and medium.

If additional screen sections are desired in apparatus 100, the liquid inlet 148 may be configured to provide wash water thereto as well. One or more of the liquid outlets 150 may be controlled or eliminated altogether so as to prevent or reduce the amount of wash water entering into any one zone 108. Additionally, a counter current washing technique may be employed to save wash water usage. With the optional addition of wash water to the apparatus 100, displacement can be achieved instead of dilution washing. As the fiber material dries, wash water may be added thereto, yet, the apparatus 100 still produces a dry material prior to the discharge chute 118. Further, the wash water may include chemicals or enzymes to be applied to the material and distributed by the paddles 132. Also, the wash water may include fine fiber or other materials, as desired. The chemicals, enzymes, or fine fiber, may be selectively added to the screen sections 102a, 102b depending on the application.

For example, because the addition of chemicals or enzymes may be more effective if the material is drier, the chemicals or enzymes may be added in the second screen section 102b but not the first screen section 102a. Also, it may be desirable to provide fine fiber in the second screen section 102b where a fiber mat is formed to help trap and carry the fine fiber out the discharge chute 118.

With further reference to FIG. 1, at least one removable access panel 153, which is situated on the top side of the side wall 120 of the housing 106, may be provided for accessing the interior of the apparatus 100. In addition, one or more external valves 154 may be situated on the underside of the side wall 120 of the housing 106 so that the filtered liquid medium from the first zone 108a, for example, may be obtained and analyzed/tested, such as for starch and protein concentrations. And although not shown, it is contemplated that one or more external valves 154 may be directly attached to one or more of the hoppers 124a, 124b, 124c.

Operation of the apparatus 100 will now be described, which is similar in nature to apparatuses 200 and 300. To facilitate understanding of various aspects of the invention, operation of the apparatus 100 will be described in the context of fiber filtration in a corn wet mill process. It should be appreciated, however, that the apparatus 100 may be used in a wide range of applications, including grain wet or dry mills and pulp and paper mills, and is not limited in use to either the corn wet mill or dry mill process described herein.

With reference again to FIG. 1, the motor 144 is activated so as to initiate rotation of the shaft 130 at its designated speed, as described above. The slurry is supplied to the feed inlet 116 so as to flow into the interior of the first screen section 102a that generally corresponds with the first zone 108a and which includes a plurality of paddles 132. In one example, the linear velocity at which the medium and material is introduced into the apparatus 100 can be the same, or close to the same, as the tangential linear velocity of the first conveyor 128a at the surface of the first screen section 102a so as to conserve on power consumption and maximize separation of the medium and material. To help control the linear velocity at which the medium and material is introduced into the apparatus 100, the feed inlet 116 or a portion thereof can be tailored to, or may be adjustable, so that the feed inlet 116 or a portion thereof has a desired shape or size, e.g., diameter. The desired size or shape of the feed inlet 116, such as the size of the opening, for example, can be dependent upon the feed rate and/or feed pressure of the medium and material.

The concavity of the flinger 143 at the proximal end of the shaft 130 adjacent the opening of the feed inlet 116 helps direct the slurry into the apparatus 100 between the plurality of paddles 132 and first screen section 102a. Wash water may also be directed therein via the outlets 150 on the shaft 130. The wash water effectively pre-washes the fiber. Due to the rotation of the shaft 130 and, thus, the plurality of paddles 132, the slurry is directed radially toward the first screen section 102a, which corresponds with the first zone 108a, to filter the material from the liquid medium as well as to move along the length of the first screen section 102a. Fiber is filtered from the slurry as the water, starch, gluten, and other relatively small constituents of the slurry pass through the first screen section 102a and drain into the first hopper 124a. The fiber and relatively large constituents of the slurry are retained in the apparatus 100.

The fiber eventually moves over the step or drop-off at the junction formed by the support ring 126 between the first and second screen sections 102a, 102b. In this regard, the fiber moves from the interior of the first screen section 102a into the interior of the second screen section 102b. When entering the second zone 108b, the fiber will pass over the support ring 126, which may cause the material and medium to undergo additional agitation. Here, wash water can also be directed therein via the outlets 150 on the shaft 130 as well as via the outlets 152 on the support ring 126. Due to the rotation of the paddles 132, the fiber is directed radially towards the second screen section 102b, which corresponds with the second zone 108b. The fiber is also moved along the length of the second screen section 102b so that the fiber is further dewatered and filtered from the liquid medium. This process allows any additional water, starch, gluten, and other relatively small constituents of the slurry to pass through the second screen section 102b and drain into the second hopper 124b situated in the second zone 108b. Because the second screen section 102b has a larger diameter than the first screen section 102a, the mat of fiber is spread over a larger surface area, which shortens the path that the water and smaller constituents must take to pass through the fiber. Further, because there is less water present in the second zone 108b as compared to the first zone 108a, the energy spent to rotate the material in the second zone 108b is less than the energy required to rotate the material in the first zone 108a. In standard paddle screen devices that are of a constant diameter, because of the speed of rotation required by the paddles in the last section to achieve a desired dryness of the solids material, the rotating speed of the paddles at the feed inlet is too high due to the amount of liquid initially present within the device. And this results in a very high energy consumption and may create too much compression of the matted material in an initial dewatering phase. The present invention allows for the different tangential velocities and centrifugal forces required in each screen section 102a, 102b, 102c, with desirable consumption of energy.

The separated fiber eventually moves towards the discharge chute 118. At the end of second zone 108b, the fiber has been sufficiently concentrated. For example, in one embodiment, the fiber may include between about 45% and about 55% water (45% to 55% solids) at the end of the second zone 108b. Those of ordinary skill in the art will recognize that the final concentration of the material may vary depending on the particular application. For example, in another embodiment, the material may include between about 55% and about 70% water (30% to 45% solids) at the end of the second zone 108b.

The washed and filtered fiber exits via the discharge chute 118. The concavity of the flinger 143 at the distal end of the shaft 130 adjacent the discharge chute 118 helps direct the de-watered fiber therein. When the fiber exits the discharge chute 118, the fiber may be transported to a remote site and further processed to result in a desired product. Moreover, the slurry that passes through the first screen section 102a, as well any wash water, starch and/or gluten, may also be further processed.

One or more of the features allow the apparatus 100, 200, 300 to be a single, self-contained device that performs both the initial pre-washing of the fiber and filtering of the liquid medium to remove the desired filtered material, and additional washing/dewatering of the material to remove additional constituents, such as additional starch and/or gluten, therefrom. The present apparatus 100 can also reduce the capital costs of the device, the labor and associated costs for maintaining the device, and the operating costs (e.g., use less water, etc.). One or more of the features of the apparatus 100, 200, 300 also allow the dewatered material to exit in a dryer condition as compared to existing filtration systems. Providing a dryer product results in less wash water required for a given purity level of fiber. Also, a dryer product may result in additional benefits. For example, in many cases, in the corn wet milling process, the fiber collected in filtration systems are further processed by directing the fiber through a press to squeeze additional water from the fiber, and then directing the fiber through a dryer. The various apparatuses that press the fiber are expensive and costly to maintain and operate. Additionally, energy costs associated with operation of the dryer are also expensive.

While the present invention has been illustrated by a description of various preferred embodiments and while these embodiments have been described in some detail, it is not the intention of the Applicant to restrict or in any way limit the scope of the appended claims to such detail. Additional advantages and modifications will readily appear to those skilled in the art.

In addition to the above, the apparatus 100, 200, 300 as described above may be found beneficial in other industrial applications. By way of example, the chemical industry utilizes a crystal formation process wherein it is desirable to bring in a bulk material, separate out the crystals contained therein, and then wash the crystals. The apparatus 100, 200, 300 as described herein may be used for such a process to achieve the results in a single device. Moreover, the juice industry similarly includes various processes wherein a bulk material is brought in and filtered. It may be desirable to wash the fruit or other bulk material as well. Again, the apparatus 100, 200, 300 as described herein may be used in such applications. Moreover, other corn or grain milling processes may benefit from filtration disclosed herein. Additionally, other industries that seek to filter a material from a medium (e.g., liquid medium or otherwise) and/or wash the material may also benefit from the screening apparatus as described herein. Those of ordinary skill in the art will recognize how to modify or configure the apparatus 100, 200, 300 so as to effectively operate in these other industries. Thus, the various features of the invention may be used alone or in numerous combinations depending on the needs and preferences of the user.

What is claimed is:

1. A multi-zoned paddle screen apparatus comprising:
   an elongated housing including at least a first zone and a second zone situated adjacent to one another along a length of the housing;
   at least first and second screen sections having a plurality of openings and being situated adjacent one another along a length of the housing so as to generally correspond with the first and second zones, respectively, wherein each of the first and second zones are configured to collect liquid medium that passes through the plurality of openings in the first and second screen sections, respectively, and wherein the second screen section is larger in diameter than the first screen section;
   a support ring that connects the first screen section and the second screen section, the support ring defines a juncture between the first screen section and the second screen section having a drop-off into the second screen section, wherein the support ring includes a liquid inlet in fluid communication with an interior of the first and/or second screen sections to supply wash water to the multi-zoned paddle screen apparatus;
   an elongated shaft including at least first and second conveyors situated lengthwise within the first and second screen sections, respectively, and along a length of the shaft so as to generally correspond with the first and second zones, respectively, at least one of the conveyors including a plurality of paddles extending in a direction away from the shaft and wherein each of the first and second conveyor sections are configured to move material in a direction along a length of the corresponding screen section;
   at least one feed inlet in fluid communication with the interior of the first screen section to supply the liquid medium and the material to the multi-zoned paddle screen apparatus; and
   a discharge chute that collects filtered material from the multi-zoned paddle screen apparatus.

2. The multi-zoned paddle screen apparatus of claim 1, wherein a juncture that connects the first screen section and the second screen section defines a drop-off into the second screen section, which is larger in diameter than the first screen section.

3. The multi-zoned paddle screen apparatus of claim 1, wherein the first screen section and the second screen section together define a cylindrical configuration of increasing diameter.

4. The multi-zoned paddle screen apparatus of claim 1, wherein the first screen section and the second screen section together define an outwardly expanding conical configuration.

5. The multi-zoned paddle screen apparatus of claim 1, wherein the first and second conveyors rotate relative to a central axis to direct the medium toward the first and second screen sections, respectively, so as to filter the material from the medium.

6. The multi-zoned paddle screen apparatus of claim 5, wherein each of the first and second conveyors are configured to provide a centrifugal force and the second conveyor provides a centrifugal force higher than that of the first conveyor.

7. The multi-zoned paddle screen apparatus of claim 1, wherein the first conveyor includes the plurality of paddles and the second conveyor includes a second plurality of paddles extending in a direction away from the shaft.

8. The multi-zoned paddle screen apparatus of claim 7, wherein the plurality of paddles of the first conveyor and the second plurality of paddles of the second conveyor radially extend in a direction away therefrom and are spaced apart from the first and second screen sections, respectively, with the second plurality of paddles of the second conveyor extending farther from the shaft than the plurality of paddles of the first conveyor.

9. The multi-zoned paddle screen apparatus of claim 7, wherein at least one of the plurality of paddles includes a plurality of bristles radially extending away therefrom towards the corresponding screen section.

10. The multi-zoned paddle screen apparatus of claim 1, wherein the feed inlet is in fluid communication with an interior of the first screen section to supply the liquid medium and the material to the multi-zoned paddle screen apparatus.

11. The multi-zoned paddle screen apparatus of claim 1, wherein the discharge chute collects filtered material from the second zone.

12. The multi-zoned paddle screen apparatus of claim 1, further comprising:
   a liquid inlet in fluid communication with an interior of the first and/or second screen sections to supply wash water to the multi-zoned paddle screen apparatus.

13. The multi-zoned paddle screen apparatus of claim 12, wherein at least one of the conveyors includes the liquid inlet to supply wash water to the multi-zoned paddle screen apparatus.

14. The multi-zoned paddle screen apparatus of claim 1, further comprising:
- a third zone situated opposite the first zone, adjacent the second zone, and along a length of the housing, wherein the third zone is larger in diameter than the second zone;
- a third screen section having a circular cross-section and a plurality of openings and being situated opposite the first screen section, adjacent the second screen section, and along a length of the housing so as to generally correspond with third zone, wherein the third zone is configured to collect liquid medium that passes through the plurality of openings in the third screen section, and wherein the third screen section is larger in diameter than the second screen section; and
- the elongated shaft further including a third conveyor situated lengthwise within the third screen section and along a length of the shaft so as to generally correspond with the third zone.

15. The multi-zoned paddle screen apparatus of claim 1, wherein one of the conveyors includes the plurality of paddles and the other conveyor includes a plurality of vanes and a ribbon flight helically winding about a length of an outer surface of the vanes.

16. The multi-zoned paddle screen apparatus of claim 1, wherein the second zone is larger in diameter than the first zone.

* * * * *